United States Patent
Pang et al.

(10) Patent No.: US 8,894,413 B2
(45) Date of Patent: Nov. 25, 2014

(54) ARCHITECTURE, METHOD, AND PROGRAM FOR GENERATING REALISTIC VEHICULAR MOBILITY PATTERNS

(75) Inventors: Marcus Pang, Manalapan, NJ (US); Wai Chen, Basking Ridge, NJ (US); Jasmine Chennikara-Varghese, Somerset, NJ (US); Ratul Guha, Kendall Park, NJ (US); John Lee, Howell, NJ (US); Rama Vuyyuru, Somerset, NJ (US); Junichiro Fukuyama, Union, NJ (US)

(73) Assignees: Telcordia Technologies, Inc., Piscataway, NJ (US); Toyota Infotechnology Center, USA, Inc., Mountain View, CA (US)

( * ) Notice: Subject to any disclaimer, the term of this patent is extended or adjusted under 35 U.S.C. 154(b) by 581 days.

(21) Appl. No.: 12/887,824

(22) Filed: Sep. 22, 2010

(65) Prior Publication Data

US 2012/0070804 A1   Mar. 22, 2012

(51) Int. Cl.
G09B 9/02 (2006.01)

(52) U.S. Cl.
CPC ........................ G09B 9/02 (2013.01)
USPC .............................. 434/29; 434/62

(58) Field of Classification Search
USPC ...................... 703/6–8; 434/29–71
See application file for complete search history.

(56) References Cited

U.S. PATENT DOCUMENTS

| | | |
|---|---|---|
| 5,801,943 A | 9/1998 | Nasburg |
| 5,863,203 A | 1/1999 | Bragdon |
| 6,172,617 B1 | 1/2001 | Bullock |
| 2002/0062207 A1 | 5/2002 | Faghri |
| 2002/0198694 A1 | 12/2002 | Yang et al. |
| 2004/0176936 A1 | 9/2004 | Ohtsu et al. |
| 2008/0026847 A1* | 1/2008 | Mueller et al. ............ 463/42 |
| 2009/0043486 A1 | 2/2009 | Yang et al. |

OTHER PUBLICATIONS

NPL_SUMO.pdf—"SUMO (Simulation of Urban MObility); An open-Source Traffic Simulation". D. Krajzewicz, G. Hertkorn, C. Rössel, P. Wagner. In: Proceedings of the 4th Middle East Symposium on Simulation and Modelling (MESM2002), Edited by: A.~Al-Akaidi, pp. 183-187, SCS European Publishing House, ISBN 90-77039-09-0.*
TSIM.pdf—'Traffic Simulation'—retrieved from <http://www.phy.ntnu.edu.tw/oldjava/Others/trafficSimulation/applet.htm> and cofirmed on the web as of Jan. 2009—<http://web.archive.org/web/20090131052750/http://www.phy.ntnu.edu.tw/oldjava/Others/trafficSimulation/applet.html[Jun. 27, 2013 10:10:24 AM]>.*
International Application No. PCT/US2011/048021—PCT International Report dated Jan. 5, 2011.

* cited by examiner

Primary Examiner — Timothy A Musselman (57) ABSTRACT

A method, simulator and program for simulating vehicular movement based upon user input parameters related to simulation topology and simulation vehicles including, but not limited to linear vehicular density. The simulator generates the simulation topology having a simulation area using the user input parameters, places a plurality of simulation vehicles within the simulation area at an initial placement using at least two input parameters related to simulation vehicle and the generated simulation topology; and determines movement of the plurality of simulation vehicles starting with the initial placement using a plurality of movement models. Each of the plurality of simulation vehicles has mobility characteristics generated using the plurality of movement models. When vehicle moves outside the simulation area, the vehicle re-emerges at a location within the simulation area. The vehicle re-emerges with new movement characteristics.

23 Claims, 8 Drawing Sheets

Figure 1

| Flag | Description |
|---|---|
| -blockDim | City block dimension in meters. E.g. 300x300. |
| -activeDim | Active dimension in number of blocks. E.g., 5x6. |
| -laneWidth | Street width. Units in meters. E.g., 3. |
| -lanesEachWay | Number of lanes in each direction. E.g., 2. |
| -twoWay | Two-way traffic in all the streets. |
| -speedMin | Minimum car speed. Units in miles/hour. E.g., 15. |
| -speedMax | Maximum car speed. E.g., 40. |
| -carDensity | Car density in cars/meter. E.g., 0.001. |
| -laneChange | Use lane-change model. |
| -simTime | Total simulation time. Units in seconds. E.g., 600. |
| -seed | Random number seed. E.g., 139. |
| -trafficLight | Traffic light location and duration. |

ARCHITECTURE, METHOD, AND PROGRAM FOR GENERATING REALISTIC VEHICULAR MOBILITY PATTERNS

FIELD OF THE INVENTION

This invention relates generally to a system, method and program for simulating vehicle mobility.

BACKGROUND

Vehicle mobility simulators have been used to virtually mimic traffic movement. The simulated movement has been used and analyzed by city planners to predict traffic patterns, to design and build new city roads and other infrastructure required for traffic flow. For example, Simulation of Urban Mobility (SUMO) is an open source simulation package that allows a user to simulate traffic flow in an urban environment such as a large city. A user can manually define the roads and other infrastructure elements for the simulation and manually define all of the vehicles needed for the simulating, starting locations and travel route.

Additionally, vehicle mobility simulators have been used in conjunction with mobile wireless networks for model movement of nodes within the network.

SUMMARY OF THE INVENTION

Accordingly, disclosed is a system, method and program for realistically simulating vehicle movement in a fixed simulation area. The disclosed system, method and program enables a user to define the simulation environment and simulation vehicles using only high level parameters, without a need to manually and tediously build the simulation area.

Disclosed is an adaptive vehicular movement simulator comprising a user interface for receiving at least one input parameter related to simulation topology and at least two input parameters related to simulation vehicles, a simulation initialization modules for creating the simulation topology having a simulation area using the at least one input parameter related to the simulation topology, a vehicle movement simulation module for placing a plurality of simulation vehicles within the simulation area at an initial placement based upon the at least two input parameters related to simulation vehicles and the created simulation topology and simulating movement of the plurality of simulation vehicles starting with the initial placement using a plurality of movement models and code generation device for converting the simulated movement into application specific code for a wireless network simulating program selected from a plurality of simulating program. The application specific codes are stored in a storage device.

Each of the plurality of simulation vehicles has mobility characteristics determined by plurality of movement models. The movement models can be a car-following model, a lane changing model and a traffic light model.

When the simulated movement moves a vehicle outside the simulation area, the vehicle re-emerges at a location within the simulation area. The vehicle re-emerges at the beginning of the same lane in which the vehicle was located. Alternatively, the vehicle re-emerges at a random location. The vehicle re-emerges with new mobility characteristics.

One of the at least two input parameters is a linear vehicular density. Another of the at least two input parameters related to simulation vehicles can be minimum vehicle speed and a maximum vehicle speed.

The at least one input parameter can be a city block dimension, a number of blocks, an active block dimension, a lane width, a number of directions of traffic flow, a number of lanes per direction of traffic flow, a simulation time, traffic light locations and a duration of traffic light.

The vehicle movement simulation module initially places the plurality of simulation vehicles randomly. The vehicle movement simulation module determines a number of vehicles for simulation using the linear vehicular density and a calculated length for each street.

Each of the plurality of vehicles is assigned a random target speed between a minimum vehicle speed and a maximum vehicle speed.

Also disclosed is a method for simulating vehicular movement comprising receiving at least one input parameter related to simulation topology and at least two input parameters related to simulation vehicles, generating the simulation topology having a simulation area using the at least one input parameter related to the simulation topology, placing a plurality of simulation vehicles within said simulation area at an initial placement using the at least two input parameters related to simulation vehicle and the generated simulation topology, and determining movement of said plurality of simulation vehicles starting with said initial placement using a plurality of movement models.

In the method, when the movement moves a vehicle outside the simulation area, the vehicle re-emerges at a location within the simulation area.

Each of said plurality of simulation vehicles has mobility characteristics generated using the plurality of movement models.

The method further comprises generating application specific code for a wireless network simulating program selected from a plurality of wireless network simulating programs for the determined movement. A format for the application specific code the said plurality of simulating programs is stored in a storage device.

In the method, one of the at least two input parameters is a linear vehicular density, and another of the at least two input parameter can be a minimum vehicle speed and a maximum vehicle speed.

In the method, the at least one input parameter can be a city block dimension, a number of blocks, an active block dimension, a lane width, a number of directions of traffic flow, a number of lanes per direction of traffic flow, a simulation time, a traffic light locations and a duration of traffic light.

The generation of the simulation topology includes, for each street, calculating a street length based upon the city block dimension, the number of blocks, the active block dimension and lane width, generating a street index number for the street; generating a lane index number for each of the lanes in the street, determining lane end points for each of the lanes in the street based upon the lane index number, street index number, street length and the input lane width and initializing at least one street and at least one lane data structure for maintaining vehicle order for each of the plurality of simulation vehicles within a street and lane.

Additionally, intersection points between horizontal and vertical streets are generated, traffic lights at the generated intersection points based upon the input traffic light locations are placed and traffic light duration for each traffic light based upon the input duration of traffic light is assigned The placement of a plurality of simulation vehicles within the simulation area at an initial placement includes, for each street, calculating a number of vehicles for the street based upon the input linear vehicular density and calculated street length, determining a number of directions of traffic flow for the street, determining a number of lanes of travel for the street based upon the determined number of directions of travel and the input number of lanes per direction of traffic flow, randomly assigning a vehicle to a lane based upon the determined number of lanes; randomly placing, within the randomly assigned lane, the vehicle at a location within the lane between the calculated end points; and sorting the at least one street and at least one lane data structures based upon the placed order of each vehicle. The leading vehicle in the street and each lane is first.

If the number of directions of traffic flow for the street is two, the calculated number of vehicles for the street is divided in half and half of the calculated number of vehicles is randomly assigned to each direction of traffic flow.

The initial speed for each vehicle is randomly determined between an input minimum vehicle speed and a maximum vehicle speed.

The plurality of movement models in the method can be a car-following model, a lane changing model and a traffic light model.

The lane changing model includes determining if a vehicle in a lane is blocked by another vehicle directly in front of the vehicle in the same lane, determining if there is a safe gap in an adjacent lane and changing lanes to the adjacent lane based upon both determinations.

Determining if a vehicle in a lane is blocked by another vehicle directly in front of the vehicle in the same lane includes determining a current speed the another vehicle directly in front; determining a desired speed for the vehicle, and comparing the desired speed to the current speed of the another vehicle directly in front. If the desired speed is less than the current speed of another vehicle, a distance between the vehicle and the another vehicle directly in front is calculated and the calculated distance is compared with a preset distance threshold.

Determining if there is a safe gap in a target lane includes retrieving the data structure for a current lane and the lanes adjacent to the current lane, determining a position for a second vehicle immediately in front of the vehicle, in one of the adjacent lanes, and a third vehicle immediately behind the vehicle, in the same adjacent lane, calculating a first distance between the vehicle and the second vehicle and a second distance between the vehicle and the third vehicle, comparing the first distance and the second distance with a safe gap threshold and switching to one of said adjacent lanes based upon the comparisons.

The traffic light model includes determining if a vehicle is at a position of a light, determining if the light is red, calculating a relative position of the vehicle and the red light, comparing the calculated relative position with a predetermined distance, determining a current speed for the vehicle, comparing the current speed with a speed threshold, and stopping for the red light based upon the comparisons.

Also disclosed is a computer readable-storage device tangibly embodying a program containing instructions for causing a computer to execute a method for simulating vehicular movement, the method comprising receiving at least one input parameter related to simulation topology and at least two input parameters related to simulation vehicles, one of the at least two input parameters being a linear vehicular density, generating the simulation topology having a simulation area using the at least one input parameter related to the simulation topology, placing a plurality of simulation vehicles within the simulation area at an initial placement using the at least two input parameters related to simulation vehicle and the generated simulation topology, and determining movement of the plurality of simulation vehicles starting with said initial placement using a plurality of movement models. Each of the plurality of simulation vehicles has mobility characteristics generated using the plurality of movement models. When the movement moves a vehicle outside the simulation area, the vehicle re-emerges at a location within the simulation area.

BRIEF DESCRIPTION OF THE FIGURES

These and other features, benefits, and advantages of the present invention will become apparent by reference to the following figures, with like reference numbers referring to like structures across the views, wherein.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure may be embodied as a program, software, or computer instructions embodied in a computer or machine usable or readable medium, which causes the computer or machine to perform the steps of the method(s) disclosed herein when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

Figure 1:
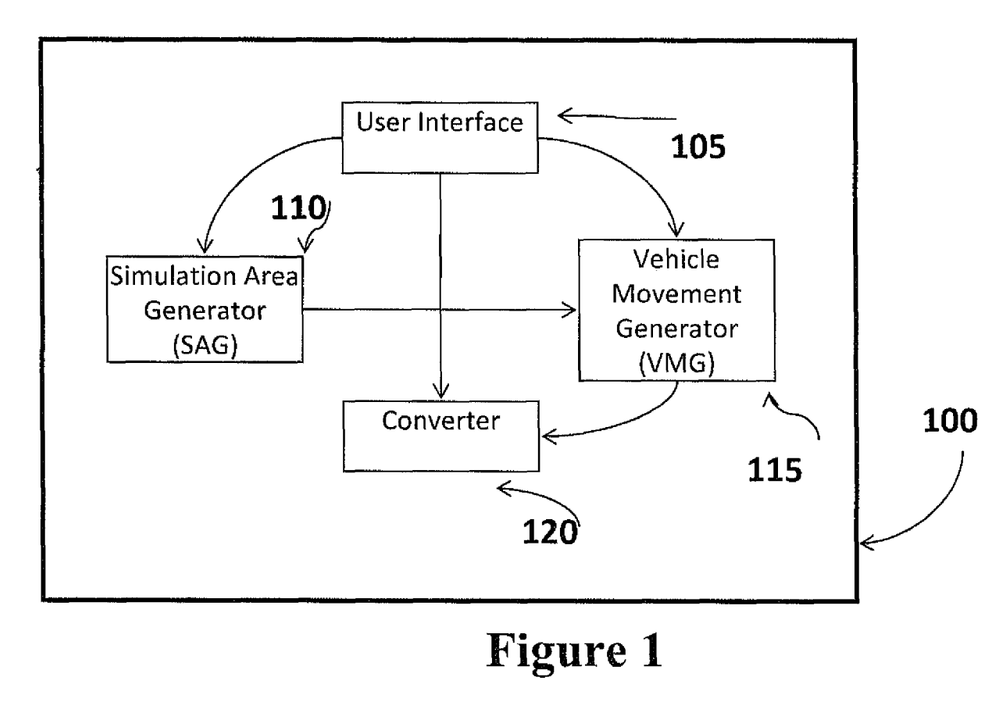
FIG. 1 is a system block diagram according to an embodiment of the invention.

FIG. 1 illustrates a block diagram of a vehicle movement simulator 100 according to an embodiment of the invention. The vehicle movement simulator 100 creates a simulation area of interest from high level specifications input by a user with realistic vehicles movement and defines movement of vehicles within the simulation area.

The vehicle movement simulator 100 includes a user interface 105, a simulation area generator (SAG) 110, a vehicle movement generator (VMG) 115 and a converter 120.

Figure 2:
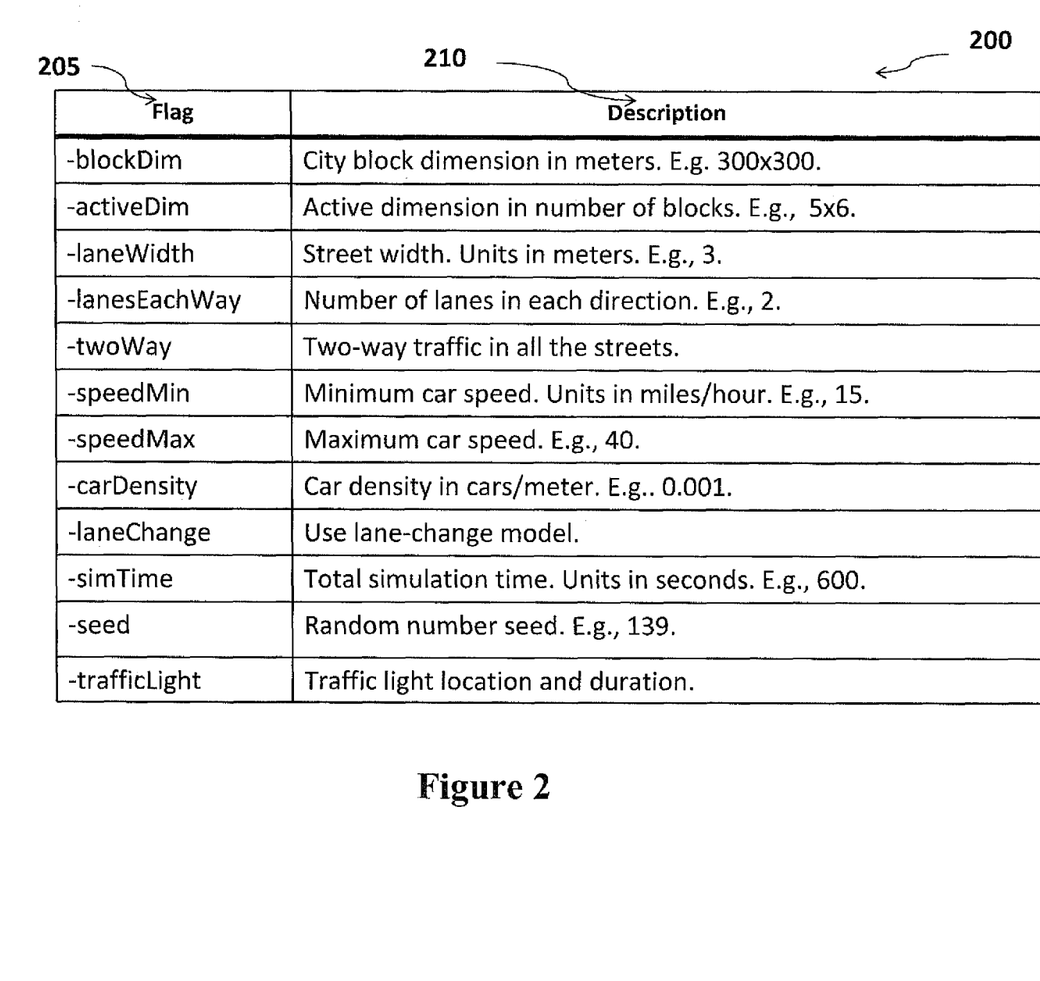
FIG. 2 is a table of exemplary user input parameters with corresponding flags.

A user inputs high level user specifications, such as, but not limited to simulation area dimension, street width, number of blocks, number of lanes, number of directions, car density, traffic light locations, maximum and minimum car speed and total simulation time. FIG. 2 illustrates exemplary high level instructions and format in a table 200. In an embodiment, the number of lanes in each street is the same. In another embodiment, the user can specify a different number of lanes for each street.

The format of the high level user specifications is defined. In an embodiment, each user specification is input via command line parameters using a parameter flag 205 and the specified values 210. For example, to specify a block dimension, the user would input "blockDim 300×300", where "blockDim" is the parameter flag 205 and the specified value 210 is 300×300. This high level specification will generate a grid with each block in the grid having a dimension of 300 m×300 m. The input high level specifications are stored in a storage device (not shown).

Figure 8:
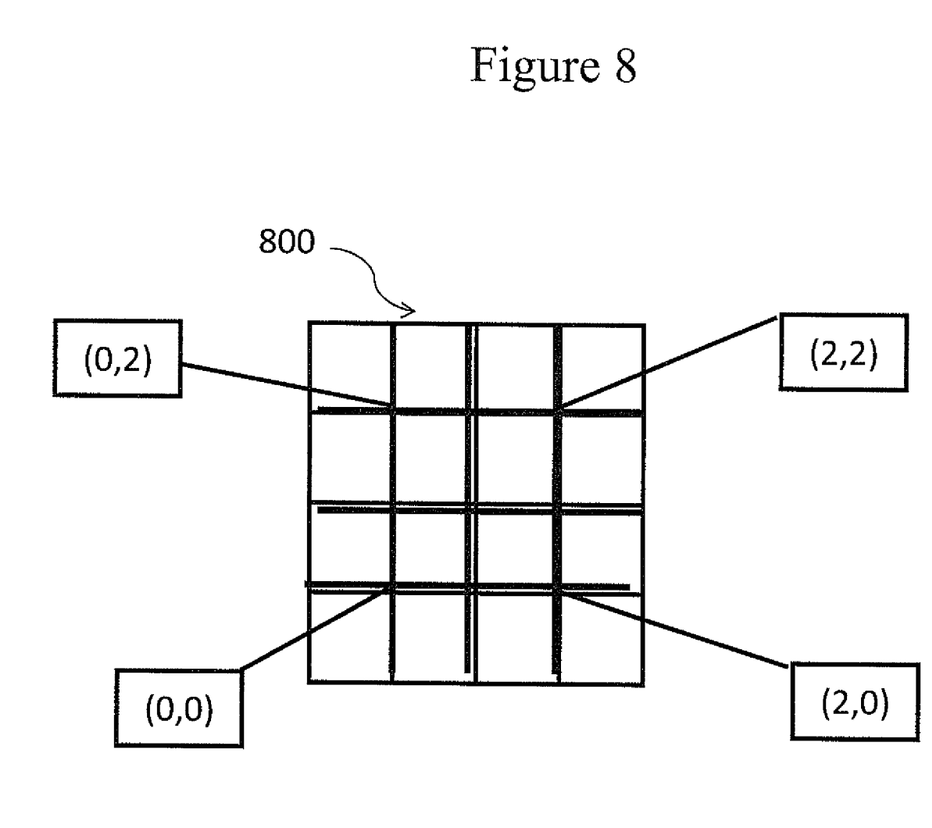
FIG. 8 is an exemplary grid.

A traffic light location is specified by a coordinate location within a grid. For example, FIG. 8 depicts an exemplary grid 800 showing for examples of coordinates (x,y). A traffic light can be placed at any desired intersection, e.g., (1,3).

In another embodiment, a graphic interface is used where the user can input the high level user specifications graphically. The graph interface can be used with a keyboard, mouse or a touch screen display.

The user interface 105 reads the user specifications and then dispatches the same to the SAG 110 to construct the simulation area according to user specification in a manner which will be described later in detail. The simulation area creates a grid, an example of which is shown in FIG. 8. The edges of each box within the grid are defined by x, y coordinates. The VMG 115 randomly distributes the vehicles at an initial position according to the user specified vehicle mobility characteristics which will also be described later in detail.

After the SAG 110 has created the simulation area, the SAG 110 dispatches the VMG 115 to calculate and generate the movement for each vehicle in a manner which will be described later in detail.

Once all of the movements are generated, the converter 120 converts the movement generated by the VMG 115 into a predetermined application specific format for a selected mobile network simulator (not shown). A plurality of predetermined application specific format is stored in a storage device (not shown). The converter 120 selects a specific format for the mobile network simulator and then converts each vehicles movement into the proper format.

Figure 3:
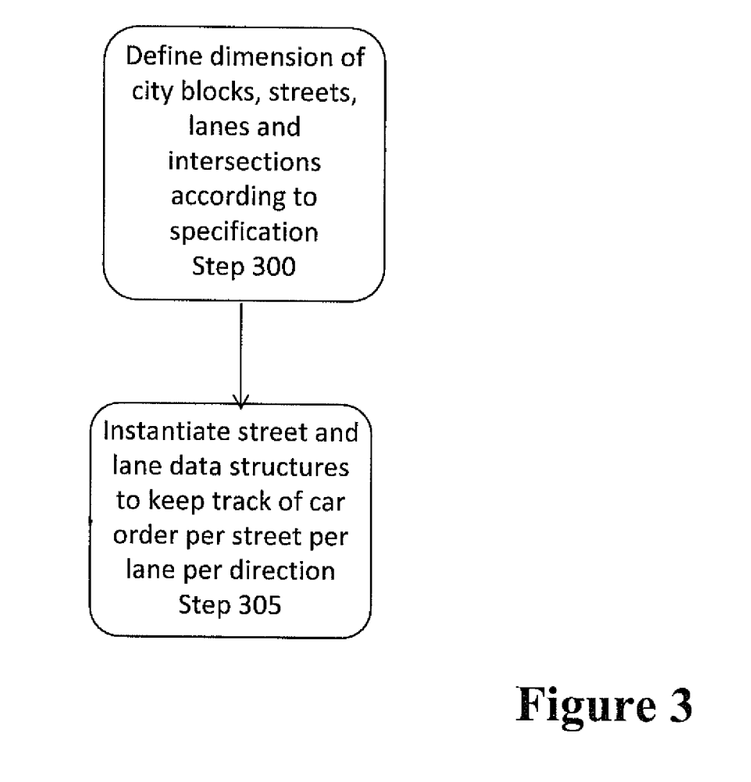
FIGS. 3 and 4 are flow charts illustrating an initialization procedure according the invention.
Figure 4:
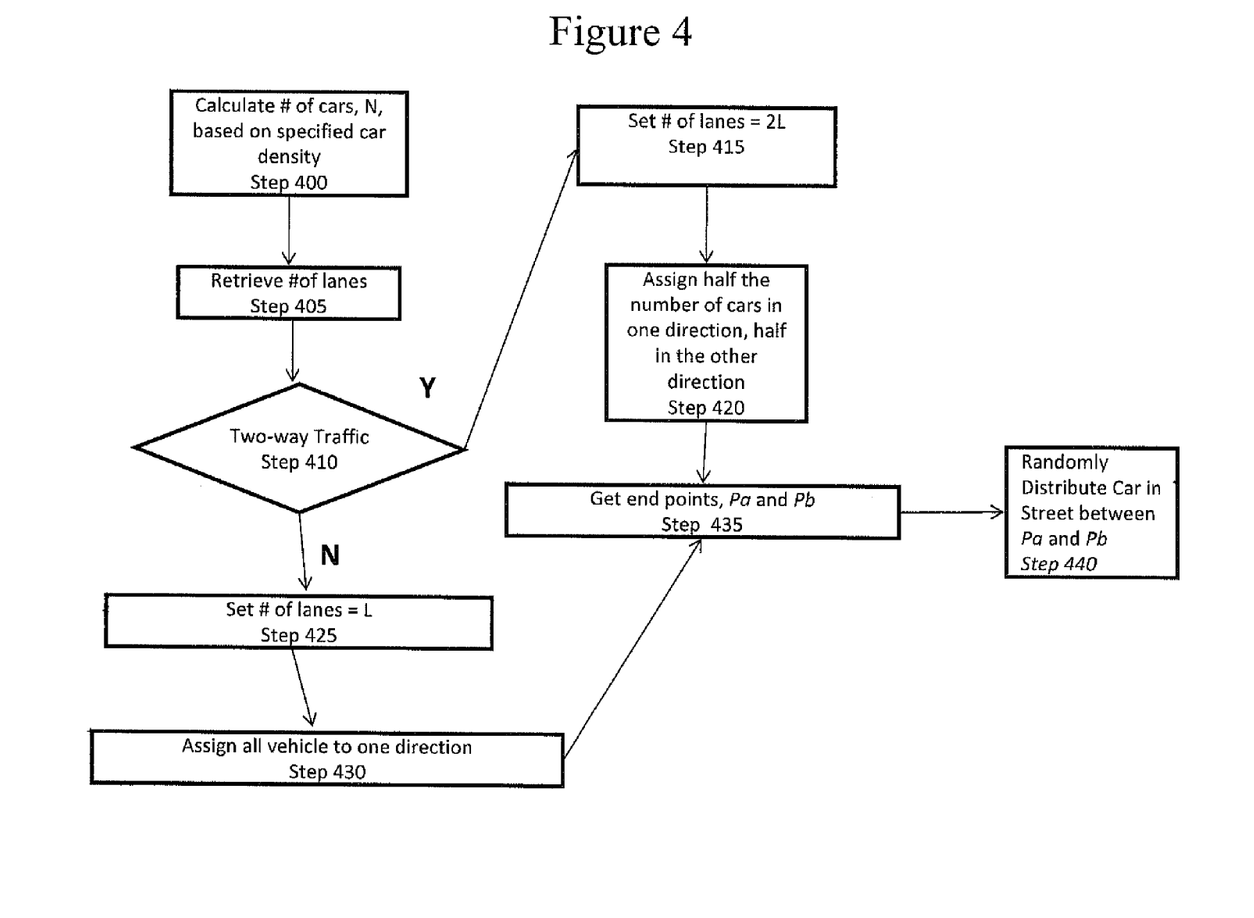

FIGS. 3 and 4 are flow charts depicting the initialization procedure according to the invention. The initialization procedure includes both generating the simulation area (FIG. 3) and initial placement with a speed for each vehicle (FIG. 4).

At step 300, the street and lane dimensions, locations and traffic light locations are defined and calculated. For example, if a user enters a -blockDim 300×300-lane Width 2-twoWay-activeDim 4×4 and -lanesEachWay 2. The simulation area generator 110 will create, at step 300, from the above specification a 4×4 grid with each block in the grid having a dimension of 300 m×300 m, a total street width is 8 m, with two way traffic and 2 lanes in each direction. In an embodiment, all streets have the same characteristics, e.g., same number of lanes, width, one or two-way traffic.

The block dimension and the active dimension will be used to calculate a total street/lane distance and a lane begin position Pa and lane end position Pb, e.g., lane end points. The distance and end points are used to place vehicles at random positions within a lane. The SAG 110 calculates a street length and beginning point Pa and end point Pb. The process is repeatedly performed for each street, i.e., from 0–(H−1), where H is the total number of streets in the horizontal direction and 0–(V−1), where V is the total number of streets in the vertical direction. The number of streets in each direction is maintained in a street index. The street index is stored in a storage device.

For a horizontal street, the length is calculated using the following formula:

$$\text{Horizontal street length} = (\text{block length in horizontal direction} \ast \text{\# horizontal blocks}) + [\text{street width} \ast \text{\# horizontal blocks}] \quad (1)$$

For a vertical street, the length is calculated using the following formula:

$$\text{Vertical street length} = (\text{block length in vertical direction} \ast \text{\# vertical blocks}) + [\text{street width} \ast \text{\# vertical blocks}] \quad (2)$$

The lane width, number of blocks and block length are user specified.

As will be described later in detail, in an embodiment, when a vehicle moves outside the endpoints of the lane and street, the vehicle re-emerges at the beginning of the street/lane. Since the vehicle reemerges at the beginning of the street/lane, a preset staging area is added at the beginning and end of a street for the vehicle waiting to be re-initialized and moved. Half a street width is added to each end.

For horizontal streets, lane end points are calculated based upon the following formulas, where Pa (x,y) are the x and y coordinates for the beginning point of the lane and Pb (x,y) are the x and y coordinates for the termination of the lane:

$$Pa(x) = 0 \quad (3)$$

$$Pa(y) = (\text{street width}/2) + (\text{block width} \ast (\text{street index} + 1)) + (\text{street width} \ast \text{street index}) + (\text{lane width} \ast \text{lane index}) + (\text{lane width}/2) \quad (4)$$

$$Pb(x) = \text{horizontal street length} \quad (5)$$

$$Pb(y) = Pa(y) \quad (6)$$

The lane index is the number of lanes within each street (both directions). The first lane in within a street is assigned as the "0" lane, the last lane in a street is assigned as either "L−1" if a one-way street or 2L−1 for a two-way street, where L is the number of lanes in each travel direction specified by the user. The lane end points calculation is repeated for each lane within a street, i.e., from 0 to L−1 or 0 to 2L−1 times.

For vertical streets, lane end points are calculated based upon the following formulas, where Pa (x,y) are the x and y coordinates for the beginning point of the lane and Pb (x,y) are the x and y coordinates for the termination of the lane:

$$Pa(x) = (\text{street width}/2) + (\text{block width} \ast (\text{street index} + 1)) + (\text{street width} \ast \text{street index}) + (\text{lane width} \ast \text{lane index}) + (\text{lane width}/2) \quad (7)$$

$$Pa(y) = 0 \quad (8)$$

$$Pb(x) = Pa(x) \quad (9)$$

$$Pb(y) = \text{vertical street length} \quad (10)$$

In an embodiment, the vehicles are positioned in the middle of a lane, which is why the formulas (4) and (7) divide the lane width in half. The lane width and number of lanes are user specified; the street width is equal to the lane width multiplied by the number of lanes.

Additionally, a traffic light duration is assigned. In an embodiment, each traffic light has the same duration. In another embodiment, the traffic light duration is variable depending on traffic congestion and simulation time. As noted above, the grid coordinates is used to place the traffic lights within the grid.

At step 305, the SAG 110 generates both street and lane data structures which are used to track the order of vehicles within a street. Initially, these data structures are empty. These data structures are filled when the vehicles are initially placed and are updated during the simulation. If a street contains more than one lane, a separate data structure is created for each lane, in addition to the street data structure. A data structure is maintained per street, and per direction of travel. For example, for a two-way street, with each side having two lanes, there would be six separate data structures maintaining the vehicle order, one data structure for each direction of travel, for the street and four lane data structures. Each of these data structures is populated and sorted by vehicle order from leading to trailing vehicle, once the VMG 115 places the vehicles at their initial positions. These data structures are updated based upon vehicle movement generated by the VMG 115. The lane and street data structures include the vehicle or node ID. A separate data structure is maintained to each vehicle. This data structure includes the vehicle or node ID (same as in the lane and street data structures), street index, lane index, direction of travel, current location, in coordinate form, current speed, desired speed, acceleration and trajectory. A vehicle's trajectory is defined by the time and current location, in coordinate form, i.e., T, X, Y), where T is time. Once, the simulation area is created, the VMG 115 begins to populate the simulation area with vehicles. The population is done on a street-by-street basis (steps 400-440 are repeated for each street in the street index, i.e., 0 to (H−1) and 0 to (V−1)). In an embodiment, all of the horizontal streets (0 to (H−1)) are populated followed by the vertical streets (0 to (V−1)).

At step 400, the VMG 115 calculates the number of vehicles needed for a street. The number of vehicles is determined based upon the user specified car density, i.e., number of vehicles per meter and the total length of the street. The total length of the street is retrieved from storage. This length was previously determined in step 300. At step 405, the VMG 115 retrieves the number of lanes for the street from storage. The number of lanes is a user specified parameter. At step 410, the VMG 115 determines if the user specified bi-directional traffic for the street, i.e., two-way traffic. If the VMG 115 determines that the user specified two-way traffic, the VMG 115, at step 415, sets the maximum number of lanes for the lane index to 2L−1, where L is the number of lanes specified by the user, where 0 is used as the first lane. Half the calculated number of vehicles (determined at step 400) is randomly assigned to each direction at step 420. If, on the other hand, the VMG 115 deter mined that the user specified one-way traffic (at step 410), then the VMG 115 set the maximum number of lanes for the lane index to be L−1, where L is the number of lanes specified by the user, where 0 is used as the first lane. All of the calculated number of vehicles for the street (determined at step 400) will be assigned to the same direction, at step 430.

At step 435, the VMG 115 retrieves the lane end points Pa and Pb calculated by the SAG 110 for a randomly determined lane assigned for the vehicle. Each vehicle is randomly assigned a lane. The VMG 115 randomly places the vehicle between the two end points Pa and Pb (for the assigned lane). In an embodiment, the VMG 115 distributes all vehicles travelling in the same direction first and then distributes all vehicles travelling in the opposite direction.

Once the vehicles are randomly distributed within the street and lanes, the data structures are populated with the initial vehicle order. A separate data structure for a street is maintained for each direction of traffic flow. For each traveling direction, sorted lists, within the data structures are kept with the vehicles listed in order from leading to trailing vehicles.

The VMG 115 initializes each vehicles speed. The VMG 115 begins with the leading vehicles within each street. The leading vehicle is determined based upon the street data structure for each direction of traffic flow. The initial speed is randomly assigned between the user specified minimum and maximum. This process is repeated for following vehicles within a street until all vehicles have an initial assigned speed. In an embodiment, the initial assign speed is also included in the street and lane data structures.

The process is repeated for each street until all streets are populated and all vehicles are given an initial position and speed. At the start of the simulation, all vehicles are randomly placed onto the road segments to ensure spatial statistical equilibrium at the start of the simulation. Data regarding the performance of the network, devices and application programs can be generated without waiting.

Once the simulation begins, the VMG 115 defines and calculates the movement for each vehicle. Similar to assigning the initial speed, movement of each vehicle is determined starting with the leading vehicle within each street (and direction). The movement is updated periodically at preset time increments.

The VMG 115 creates a realistic vehicle movement using a plurality of models, including but not limited to, a car following model, a lane changing model and a traffic light model. These models are applied to each vehicle each time the movement is periodically updated.

Figure 5:
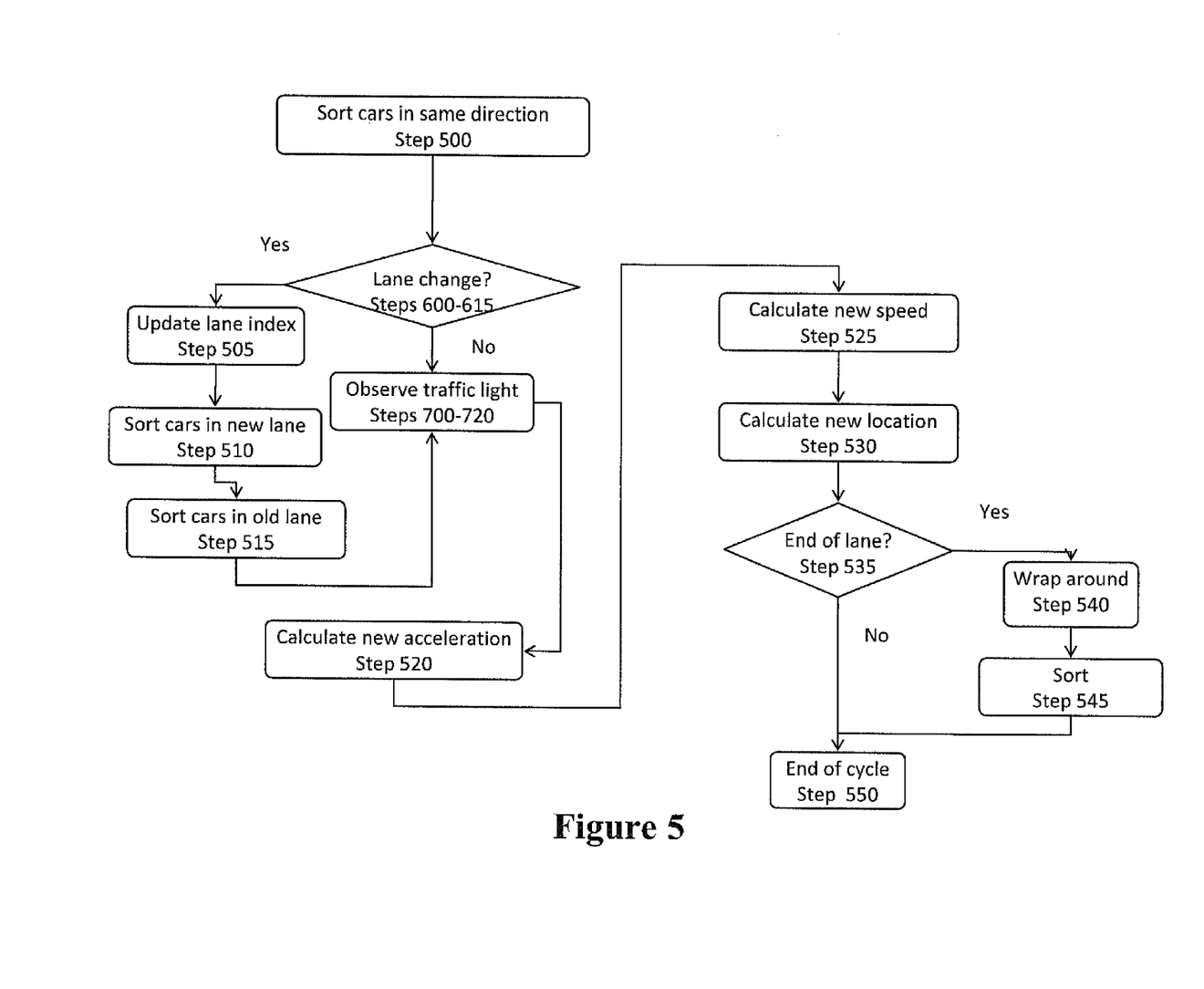
FIGS. 5-7 are flow charts illustrating a movement generating procedure according to the invention.
Figure 6:
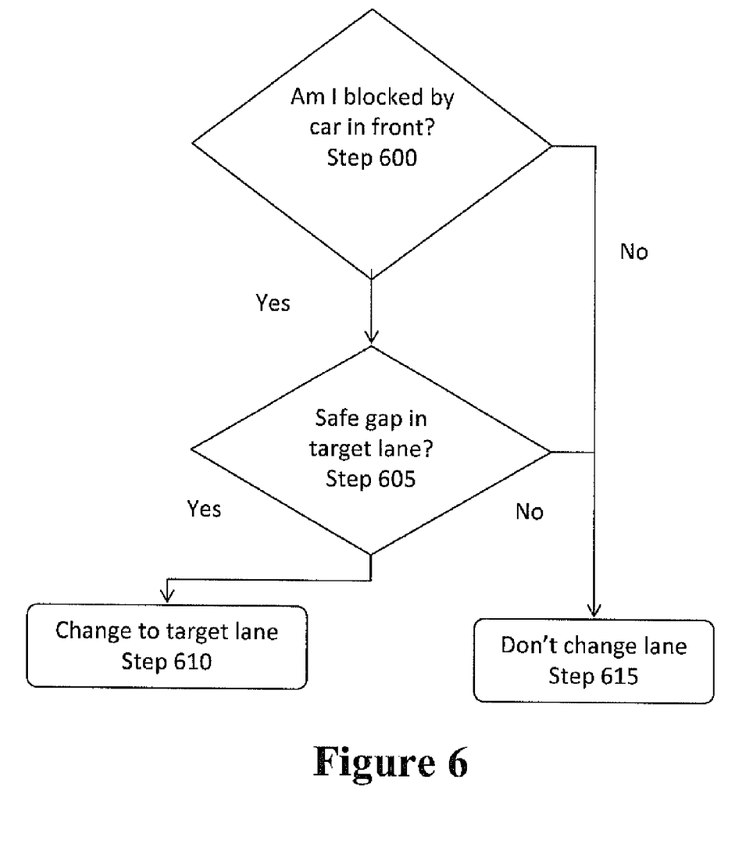
Figure 7:
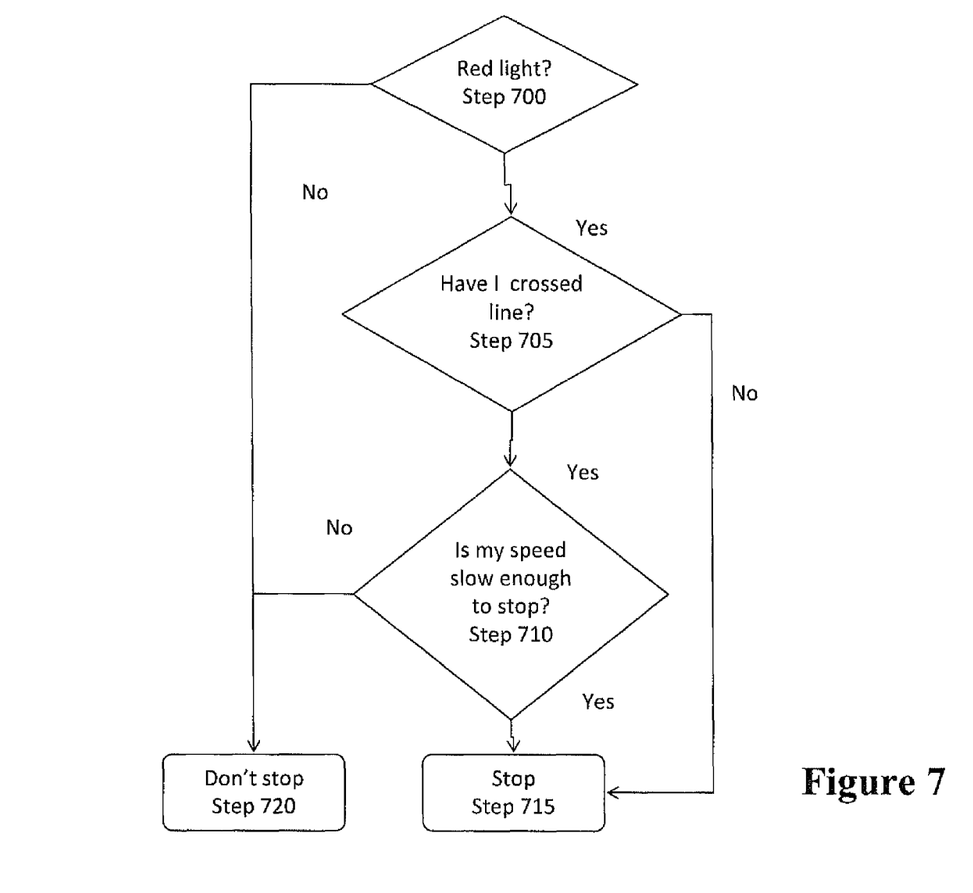

FIGS. 5-7 illustrate flow charts showing vehicle movement generation. The process began with the VMG 115 sorting all vehicles traveling in the same direction in a street at step 500. This sorting is similar to the sorting performed by the VMG 115 during the population of the simulation area with vehicles. The sorting sorts the vehicles by position starting with the leading vehicle and ending with the last vehicle within the street (one data structure per direction). Since the vehicles are initially sorted, this step is skipped during the first periodic update, i.e., first movement calculation after initial placement and speed assignment. This sorting includes sorting each lane data structure, and street data structures, where the leading vehicle in a street/lane is first and the last vehicle in the street/lane is last.

For each vehicle, the VMG 115 determines if the vehicle needs to change lanes (steps 600-615), if there is a need stop for a traffic light (steps 700-720), if there is a need to accelerate/decelerate, determines the new speed and position.

The VMG 115 uses a lane-change model to determine if there is a need to change lanes. A lane change model according to an embodiment of the invention is described in FIG. 6. At step 600, the VMG 115 determines if a vehicle is blocked by another vehicle in front (Cf) of the current vehicle in the same lane. A vehicle is blocked by another vehicle if the current speed of the vehicle in front of the vehicle "$v_f$" is less than the desired velocity "$v_o$" for the current vehicle and if the distance between the vehicle and the vehicle in front Cf is less than a predetermined distance. In an embodiment, the desired velocity is the initial speed randomly assigned by the VMG 115 during initialization.

As noted above, in an embodiment, each vehicle has a separate data structure having its movement characteristics and identifier. In another embodiment, the movement characteristics, such as, the desired velocity $v_o$ is included in the lane and street data structures and associated with the vehicle.

Additionally, in an embodiment, the current position within a street and lane is also included in the lane and street data structures.

The VMG 115 obtains the lane data structure for the current lane and the lanes immediately to the left and right of the current lane, if any. Vehicles can change lanes either to the left or right. In another embodiment, vehicles can only pass another vehicle on the left.

The VMG 115 calculates the current distance between the vehicle and the vehicle in front Cf using the current position of the vehicle (x1, y1) and current position of the vehicle in front. (x2, y2). For a vertical street, the "x" coordinate will be the same and for a horizontal street, the "y" coordinate will be the same. This distance will be compared with the predetermined distance. Additionally, the VMG 115 will compare $v_f$ with $v_o$. If the current distance between the vehicle and the vehicle in front is less than the predetermined distance and if $v_f$ is less than $v_o$, then the VMG 115 will proceed to step 605 to determine if it is safe to change lanes.

The VMG 115 uses the position from the adjacent lane data structures to determine if there is a safe gap. The VMG 115 determines if there is a gap between the closest vehicle in the target lane $C_t$ (ahead of the current position of the current vehicle) and the vehicle. The VMG 115 calculated the distance between $C_t$ whose position is $x_t$ and $y_t$ and the current position of the vehicle x1, y1. This distance is compared with a predetermined minimum gap ($S_o$), e.g., 3 m. This procedure is repeated to determine the gap between the current vehicle and the closest vehicle behind the current vehicle in the target lane. If both calculated distances between the current vehicle and the vehicles in front and behind (in target lane) is greater than the predetermined minimum gap, the vehicle will change lanes, at step 610. If not, the vehicle will remain in the same lane, at step 615.

The VMG 115 can also use the relative speed between Ct and the current vehicle to determine if there is a safe gap. If the current vehicle's speed is significantly greater than the speed of Vt then the vehicle will not change lanes as there is not a safe gap.

When a vehicle changes lanes, the lane data structures for the old and new lanes are updated, at step 505. The vehicle is deleted from the old lane data structure and added to the new data structure. Initially, the vehicle is added to the end of the sorted data structure. The lane and street data structures are sorted. At step 510, the new lane data structure is sorted by position to account for the relative position of the new vehicle in the lane, starting from the leading vehicle in the new lane. At step 515, the old lane data structured is sorted by position to account for the deletion of the vehicle that changed lanes. After both lane data structures are sorted, the street data structure is sorted.

The VMG 115 uses a traffic-light model to determine if there is a need to stop at a traffic light. A traffic-light model according to an embodiment of the invention is described in FIG. 7. At step 700, the VMG 115 determines if a vehicle is at a red traffic light. The VMG compares the vehicles current position (x1, y1) with the position of the traffic lights (xL, yL). If the current position is near a traffic light, the VMG 115, will determine if that traffic light is red based upon the user set red light duration and the current time within the simulation period. In an embodiment, the user can set the green light duration as well as the red light duration. In an embodiment, the VMG 115 use the current speed of the vehicle to determine if a red traffic light will still be red when the vehicle passes its location. If the vehicle is not near a traffic light or if the traffic light is not red (or will not be red when the vehicle passes its location), the vehicle will not stop (step 720).

Each traffic light is associated with a preset conditional stopping distance (D). If the traffic light is red (at step 700), the VMG 115 determines if the distance to the traffic light is less than the preset conditional stopping distance D. The VMG 115 compares the vehicles current position (x1, y1) with D. If the distance between the vehicle and traffic light is greater than D (at step 705), then the vehicle will stop, at step 715. If the distance between the vehicle and traffic light is less than D (at step 705), the VMG 115 must determine if it is safe to stop, i.e., if the vehicles speed is slow enough to stop, at step 710. The VMG 115 compares the current speed with preset stopping velocity threshold. The preset stopping velocity threshold is set based upon the preset conditional stopped distance D. If the current speed is less than the preset stopping velocity threshold, the vehicle will stop, at step 715, otherwise the vehicle will not stop (step 720).

When a vehicle approaches another vehicle or a red traffic light, a car-following model is triggered (step 520). In order to stop or if the vehicle in front has a lower speed than that of the current vehicle, the current vehicle will decelerate. The acceleration/deceleration is calculated using the following formula:

$$dv/dt = a[1-(v/v_0)^4-(s^*/s)^2], \quad (11)$$

where:
$s^* = s_0 + vT + v\Delta v/[2\sqrt{(ab)}]$
$v_0$=desired velocity
T=desired safety time headway=1.5 s
a=acceleration=0.3 m/s$^2$
b=deceleration=3 m/s$^2$
v=current speed
$s_0$=Minimum vehicle gap=3 m
s=the actual gap between the current vehicle and the vehicle in front
$\Delta v$=speed difference between current vehicle and vehicle in front When a vehicle is stopping for a red light, the red light is equivalent to a vehicle in front having a speed of zero.

When a vehicle changes lanes (at step 610), the VMG 115, performs step 520 for the new lane. When a vehicle does not change lanes (at step 615), the VMG 115, performs step 520 for the original lane. At step 525, the VMG 115, calculates the new speed of the vehicle using the acceleration/deceleration determined in step 520 and the current speed v.

After the new speed is calculated, the VMG 115 determines the new location of the vehicle, i.e., x1+δx, y1+δy, where δx and δy are the distances moved at the x and y directions at the new speed, at step 530. The street and lane data structures are updated with the new speed and location information.

At step 535, the VMG 115 determines if the new location of the vehicle is within the simulation area, i.e., if the vehicle has moved beyond the end of the lane. The VMG 115 compares the new location x1+δx, y1+δy with the end of the lane location Pb(x,y). If the vehicle is beyond the end of the lane, then the vehicle is deleted from the data structure as the leading vehicle and re-emerges within the simulation area as a new vehicle have a new set of mobility characteristics including, but not limited to a new position and initial speed, at step 540.

In an embodiment, the vehicle re-emerges at the beginning of the same lane that the vehicle was travelling on in the staging area. The vehicle is added to the end of the same lane and street data structures. The position of the vehicle is determined as Pa. A new speed is randomly generated between the minimum and maximum speed.

In another embodiment, the vehicle re-emerges at a random location within the simulation area, i.e., random street and lane. First, a random street is selected between 0 and H−1 and 0 and V−1. Then, within the selected street, a random lane is selected between 0 and L−1, for a one-way street and 0 and 2L−1 for two-way street.

Lastly, the location within the lane and street is randomly set between Pa and Pb, where Pa and Pb are the end points for the selected lane. The vehicle is added to the data structures for the selected street and lane, if more than one lane. A new speed is randomly generated between the minimum and maximum speed.

By having a vehicle re-emerge with different characteristics, a longer simulation can occur without exhausting computer resources whether or not the simulation tool supports dynamic computer resource allocation as a same number of vehicles is used regardless of the length of the simulation. Furthermore, by having the vehicles re-emerge with different characteristics, the problem of memory fragmentation caused by dynamic resource allocation is avoided.

Once the vehicle re-emerged with new mobility characteristics and has been added to the lane and street data structures, both the lane and street data structures are sorted to account for the relative position of the new vehicle with respect to the other vehicles in the lane and street, at step 545. The sorting process has been described above with respect to steps 510 and 515 and will not be described again. The cycle is ended at step 550.

Steps 500-550, 600-615 and 700-720 are repeated for all vehicles in the simulation, each time the movement is updated. Once all of these steps are performed for the leading vehicle in a street, the process is then repeated for the following vehicle until the user-defined simulation time (-simTime in FIG. 2) is exceeded. Afterwards, the VMG 115 repeats this process for all other streets until all streets have been finished.

In an embodiment, each time movement is generated by the VMG 115, the converter 120 is triggered. The converter 120 converts the movement that is generated by the VMG 115 into a format that is readable and can be processed by a wireless mobile network simulator (not shown). A wireless mobile network simulator is a system and program that simulates wireless connections between mobile nodes to evaluate networking protocols. The network simulation tool stimulates wireless and/or wired communication networks for the purpose of evaluating network protocols, networking devices and/or application performance.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. An adaptive vehicular movement simulator comprising:
a computer comprising:
a user interface for receiving at least one input parameter related to simulation topology and at least two input parameters related to simulation vehicles, one of the at least two input parameters being a linear vehicular density;
a simulation initialization module for creating the simulation topology having a simulation area using the at least one input parameter related to the simulation topology;
a vehicle movement simulation module for placing a plurality of simulation vehicles with the simulation area at an initial placement based upon the at least two input parameters related to simulation vehicles and the created simulation topology and simulating movement of the plurality of simulation vehicles starting with the initial placement using a plurality of movement models, each of the plurality of simulation vehicles has mobility characteristics determined by plurality of movement models, when the simulated movement moves a vehicle outside the simulation area, the vehicle re-emerges at a location within the simulation area; and
a converter for converting the simulated movement into an application specific format for a mobile wireless network simulating program selected from a plurality of predetermined application specific formats, the application specific formats are stored in a storage device.

2. The adaptive vehicular movement simulator of claim 1, wherein the at least one input parameter is selected from a group comprising of a city block dimension, a number of blocks, an active block dimension, a lane width, a number of directions of traffic flow, a number of lanes per direction of traffic flow, a simulation time, traffic light locations and duration of traffic light.

3. The adaptive vehicular movement simulator of claim 1, wherein another of the at least two input parameters related to simulation vehicles is selected from a group comprising a minimum vehicle speed and a maximum vehicle speed.

4. The adaptive vehicular movement simulator of claim 3, wherein each of the plurality of vehicles is assigned a random target speed between the minimum vehicle speed and the maximum vehicle speed.

5. The adaptive vehicular movement simulator of claim 1, wherein the initial placement of the plurality of simulation vehicles is random.

6. The adaptive vehicular movement simulator of claim 1, wherein the initial placement of the plurality of simulation vehicles includes determining a number of vehicles in the plurality of simulation vehicles using the linear vehicular density and a calculated length for each street.

7. The adaptive vehicular movement simulator of claim 1, wherein when the simulated movement moves a vehicle outside the simulation area, the vehicle re-emerges at a location within the simulation area with new mobility characteristics.

8. The adaptive vehicular movement simulator of claim 7, wherein when the simulated movement moves a vehicle outside the simulation area, the vehicle re-emerges at the beginning of the same lane in which the vehicle was located.

9. The adaptive vehicular movement simulator of claim 7, wherein when the simulated movement moves a vehicle outside the simulation area, the vehicle re-emerges at a random location.

10. The adaptive vehicular movement simulator of claim 1, wherein the plurality of movement models is selected from a group comprising a car-following model, a lane changing model and a traffic light model.

11. A method for simulating vehicular movement comprising the computer implemented steps of:
receiving at least one input parameter related to simulation topology and at least two input parameters related to simulation vehicles, one of the at least two input parameters being a linear vehicular density;
generating the simulation topology having a simulation area using the at least one input parameter related to the simulation topology;
placing a plurality of simulation vehicles within the simulation area at an initial placement using the at least two input parameters related to simulation vehicle and said generated simulation topology;
determining movement of the plurality of simulation vehicles starting with the initial placement using a plurality of movement models, each of the plurality of simulation vehicles has mobility characteristics generated using the plurality of movement models, when the movement moves a vehicle outside the simulation area, the vehicle re-emerges at a location within the simulation area; and
generating an application specific format for a wireless network simulating program selected from a plurality of mobile wireless network simulating programs for said determined movement, a format for the application specific format for the plurality of simulating programs is stored in a storage device.

12. The method for simulating vehicular movement of claim 11, wherein the plurality of movement models is selected from a group comprising a car-following model, a lane changing model and a traffic light model.

13. The method for simulating vehicular movement of claim 12, wherein the lane changing model comprises:
determining if a vehicle in a lane is blocked by another vehicle directly in front of the vehicle in the same lane;
determining if there is a safe gap in an adjacent lane; and
changing lanes to the adjacent lane based upon both determinations.

14. The method for simulating vehicular movement of claim 13, wherein determining if a vehicle in a lane is blocked by another vehicle directly in front of the vehicle in the same lane further comprises:
determining a current speed the another vehicle directly in front;
determining a desired speed for the vehicle; and
comparing the desired speed to the current speed of the another vehicle directly in front,
wherein if the desired speed is less than the current speed of the another vehicle, the determining if a vehicle in a lane is blocked by another vehicle directly in front of the vehicle in the same lane further comprises:
calculating a distance between the vehicle and the another vehicle directly in front; and
comparing the calculated distance to a preset distance threshold.

15. The method for simulating vehicular movement of claim 13, wherein the determining if there is a safe gap in a target lane further comprises:
retrieving the data structure for a current lane and the lanes adjacent to the current lane;
determining a position for a second vehicle immediately in front of the vehicle, in one of the adjacent lanes, and a third vehicle immediately behind the vehicle, in the same adjacent lane;
calculating a first distance between the vehicle and the second vehicle and a second distance between the vehicle and the third vehicle;
comparing the first distance and the second distance with a safe gap threshold; and
switching to one of the adjacent lanes based upon said comparisons.

16. The method for simulating vehicular movement of claim 12, wherein said traffic light model comprises:
determining if a vehicle is at a position of a light;
determining if the light is red;
calculating a relative position of the vehicle and the red light;
comparing said calculated relative position with a predetermined distance;
determining a current speed for the vehicle;
comparing the current speed with a speed threshold; and
stopping for the red light based upon said comparisons.

17. A method for simulating vehicular movement using a computer comprising the computer implemented steps of:
receiving at least one input parameter related to simulation topology and at least two input parameters related to simulation vehicles, one of the at least two input parameters being a linear vehicular density;
generating the simulation topology having a simulation area using the at least one input parameter related to the simulation topology;
placing a plurality of simulation vehicles within the simulation area at an initial placement using the at least two input parameters related to simulation vehicle and said generated simulation topology; and
determining movement of the plurality of simulation vehicles starting with the initial placement using a plurality of movement models, each of the plurality of simulation vehicles has mobility characteristics generated using the plurality of movement models, when the movement moves a vehicle outside the simulation area, the vehicle re-emerges at a location within the simulation area;
wherein the at least one input parameter is selected from a group comprising of a city block dimension, a number of blocks, an active block dimension, a lane width, a number of directions of traffic flow, a number of lanes per direction of traffic flow, a simulation time, traffic light locations and duration of traffic light; and
wherein said generating said simulation topology comprises:
for each street,
calculating a street length based upon the city block dimension, the number of blocks, the active block dimension and lane width;
generating a street index number for said street;
generating a lane index number for each of the lanes in said street;
determining lane end points for each of the lanes in said street based upon the lane index number, street index number, street length and the input lane width; and
initializing at least one street and at least one lane data structure for maintaining vehicle order for each of the plurality of simulation vehicles within a street and lane.

18. The method for simulating vehicular movement of claim 17, wherein said generating the simulation topology further comprises:
generating intersection points between horizontal and vertical streets;
placing traffic lights at the generated intersection points based upon the input traffic light locations; and
assigning a traffic light duration for each traffic light based upon the input duration of traffic light.

19. The method for simulating vehicular movement of claim 17, wherein said placing a plurality of simulation vehicles within the simulation area at an initial placement comprises:
for each street, calculating a number of vehicles for the street based upon the input linear vehicular density and calculated street length;

determining a number of lanes of travel for the street based upon said input number of directions of travel and the input number of lanes per direction of traffic flow;

assigning randomly a vehicle to a lane based upon said input number of lanes;

placing, within the randomly assigned lane, the vehicle at a random location within the lane between the calculated end points; and sorting the at least one street and at least one lane data structures based upon a placed order of each vehicle, the leading vehicle in the street and each lane is first.

20. The method for simulating vehicular movement of claim 19, wherein if the number of directions of traffic flow for the street is two, said placing a plurality of simulation vehicles within the simulation area at an initial placement further comprises:

dividing the calculated number of vehicles for the street in half; and assigning randomly half the calculated number of vehicles for each direction of traffic flow.

21. The method for simulating vehicular movement of claim 19, wherein another of the at least two input parameters related to simulation vehicles is selected from a group comprising a minimum vehicle speed and a maximum vehicle speed.

22. The method for simulating vehicular movement of claim 21, wherein said placing a plurality of simulation vehicles within said simulation area at an initial placement further comprises:

determining, randomly, an initial speed for each vehicle, the initial random speed is set between the input minimum vehicle speed and the maximum vehicle speed.

23. A computer readable storage device tangibly embodying a program containing instructions for causing a computer to execute a method for simulating vehicular movement, said method comprising:

receiving at least one input parameter related to simulation topology and at least two input parameters related to simulation vehicles, one of the at least two input parameters being a linear vehicular density;

generating the simulation topology having a simulation area using the at least one input parameter related to the simulation topology;

placing a plurality of simulation vehicles within the simulation area at an initial placement using the at least two input parameters related to simulation vehicle and said generated simulation topology; and determining movement of the plurality of simulation vehicles starting with the initial placement using a plurality of movement models, each of the plurality of simulation vehicles has mobility characteristics generated using the plurality of movement models, when the movement moves a vehicle outside the simulation area, the vehicle re-emerges at a location within the simulation area;

wherein the at least one input parameter is selected from a group comprising of a city block dimension, a number of blocks, an active block dimension, a lane width, a number of directions of traffic flow, a number of lanes per direction of traffic flow, a simulation time, traffic light locations and duration of traffic light; and wherein said generating said simulation topology comprising:

for each street, calculating a street length based upon the city block dimension, the number of blocks, the active block dimension and lane width;

generating a street index number for said street;

generating a lane index number for each of the lanes in said street;

determining lane end points for each of the lanes in said street based upon the lane index number, street index number, street length and the input lane width; and initializing at least one street and at least one lane data structure for maintaining vehicle order for each of the plurality of simulation vehicles within a street and lane.

* * * * *

UNITED STATES PATENT AND TRADEMARK OFFICE
CERTIFICATE OF CORRECTION

| | |
|---|---|
| PATENT NO. | : 8,894,413 B2 |
| APPLICATION NO. | : 12/887824 |
| DATED | : November 25, 2014 |
| INVENTOR(S) | : Pang et al. |

It is certified that error appears in the above-identified patent and that said Letters Patent is hereby corrected as shown below:

On the Title Page, item (56), under "OTHER PUBLICATIONS", in Column 2, Line 9, delete "cofirmed" and insert -- confirmed --, therefor.

In the specification

In Column 4, Line 21, delete "invention;" and insert -- invention; and --, therefor.

In Column 7, Line 49, delete "deter mined" and insert -- determined --, therefor.

Signed and Sealed this
Tenth Day of November, 2015

Michelle K. Lee
*Director of the United States Patent and Trademark Office*